(12) United States Patent
Young

(10) Patent No.: US 9,927,263 B2
(45) Date of Patent: Mar. 27, 2018

(54) INTRUSION DETECTION SYSTEM FOR AN UNDERSEA ENVIRONMENT

(71) Applicant: The Penn State Research Foundation, University Park, PA (US)

(72) Inventor: Randy Young, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 15/287,013

(22) Filed: Oct. 6, 2016

(65) Prior Publication Data

US 2017/0023384 A1 Jan. 26, 2017

Related U.S. Application Data

(63) Continuation-in-part of application No. 15/268,769, filed on Sep. 19, 2016, which is a continuation-in-part
(Continued)

(51) Int. Cl.
*G08B 13/18* (2006.01)
*G01D 5/26* (2006.01)
(Continued)

(52) U.S. Cl.
CPC ............. *G01D 5/268* (2013.01); *G01V 1/001* (2013.01); *G02B 6/4427* (2013.01); *G02B 6/506* (2013.01);
(Continued)

(58) Field of Classification Search
CPC .................................. G01M 1/00; H04B 1/00
See application file for complete search history.

(56) References Cited

U.S. PATENT DOCUMENTS 3,262,275 A 7/1966 Perret
3,568,456 A 3/1971 Van Loenen
(Continued)

FOREIGN PATENT DOCUMENTS

DE 8629389 U1 2/1987
DE 4006597 A1 9/1991

OTHER PUBLICATIONS

International Search Report and Written Opinion dated Oct. 14, 2014 for co-pending application No. PCT/US2014/044846.

*Primary Examiner* — Shirley Lu
(74) *Attorney, Agent, or Firm* — Dinsmore & Shohl LLP

(57) ABSTRACT

An intrusion detection system includes a suspended optical fiber having a neutral buoyancy and an optical time-domain reflectometer connected to the suspended optical fiber at an origin location. The suspended optical fiber is connected to a mooring at a first end of the suspended optical fiber and further includes at least one terminal end. The optical time-domain reflectometer includes a light source operable to emit an optical pulse of light into the suspended optical fiber from the origin location toward the terminal end, and a processor operable to receive an optical return signal from the terminal end of the suspended optical fiber or from a deformation created by a disturbance to the suspended optical fiber and to determine a location and a type of the disturbance based on an analysis of at least a time to receive the optical return signal and a magnitude of the optical return signal.

24 Claims, 10 Drawing Sheets

Related U.S. Application Data of application No. 14/319,232, filed on Jun. 30, 2014, now Pat. No. 9,606,314, application No. 15/287,013, which is a continuation-in-part of application No. 14/319,232, filed on Jun. 30, 2014, now Pat. No. 9,606,314.

(60) Provisional application No. 61/957,421, filed on Jul. 2, 2013, provisional application No. 62/237,770, filed on Oct. 6, 2015.

(51) Int. Cl.
| | | |
|---|---|---|
| *G01V 1/00* | (2006.01) | |
| *G02B 6/44* | (2006.01) | |
| *G02B 6/50* | (2006.01) | |
| *H02G 1/10* | (2006.01) | |
| *H02G 9/12* | (2006.01) | |

(52) U.S. Cl.
CPC ............... *H02G 1/10* (2013.01); *H02G 9/12* (2013.01); *Y10T 428/2933* (2015.01)

(56) References Cited

U.S. PATENT DOCUMENTS

| | | |
|---|---|---|
| 3,766,307 A | 10/1973 | Andrews, Jr. |
| 4,104,886 A | 8/1978 | Dumont et al. |
| 4,341,440 A | 7/1982 | Trezeguet et al. |
| 4,399,322 A | 8/1983 | Hafner, Jr. |
| 4,477,725 A | 10/1984 | Asawa et al. |
| 4,610,505 A | 9/1986 | Becker et al. |
| 4,662,712 A | 5/1987 | Tabata et al. |
| 4,763,981 A | 8/1988 | Wilkins |
| 5,054,881 A | 10/1991 | Fisher et al. |
| 5,194,847 A | 3/1993 | Taylor et al. |
| 5,784,337 A | 7/1998 | Rainey et al. |
| 5,923,616 A | 7/1999 | Badger et al. |
| 6,211,964 B1 | 4/2001 | Luscombe et al. |
| 6,239,363 B1 | 5/2001 | Wooters |
| 6,285,806 B1 | 9/2001 | Kersey et al. |
| 6,323,420 B1 | 11/2001 | Head |
| 6,980,108 B1 | 12/2005 | Gebbia et al. |
| 7,271,884 B2 | 9/2007 | Payton |
| 7,274,441 B2 | 9/2007 | Payton |
| 7,277,162 B2 | 10/2007 | Williams |
| 7,488,929 B2 | 2/2009 | Townley-Smith et al. |
| 7,755,971 B2 | 7/2010 | Heatley et al. |
| 7,822,306 B2 | 10/2010 | Shinoski et al. |
| 7,993,077 B2 | 8/2011 | Alliot |
| 8,054,070 B1 | 11/2011 | Lanzagorta-Saldana |
| 8,195,409 B2 | 6/2012 | Bruno et al. |
| 8,226,328 B2 | 7/2012 | Thompson et al. |
| 8,279,714 B2 | 10/2012 | Paul et al. |
| 8,340,844 B2 | 12/2012 | Scoca et al. |
| 8,369,673 B2 | 2/2013 | Hawkes et al. |
| 8,493,815 B2 | 7/2013 | Fernihough et al. |
| 8,837,938 B2 | 9/2014 | Liu et al. |
| 8,937,713 B2 | 1/2015 | Huffman |
| 8,957,312 B2 | 2/2015 | McCullough et al. |
| 2004/0020653 A1 | 2/2004 | Smith |
| 2005/0002017 A1* | 1/2005 | Haran .................... G01N 21/21 |
| | | 356/73.1 |
| 2005/0226584 A1* | 10/2005 | Williams ................ D04C 1/02 |
| | | 385/130 |
| 2006/0120675 A1 | 6/2006 | Goldner et al. |
| 2006/0233485 A1* | 10/2006 | Allen ...................... F17D 5/00 |
| | | 385/13 |
| 2008/0014812 A1 | 1/2008 | Quigley et al. |
| 2009/0074367 A1* | 3/2009 | Shinoski ............... G02B 6/4427 |
| | | 385/113 |
| 2009/0145613 A1 | 6/2009 | Coronado |

* cited by examiner

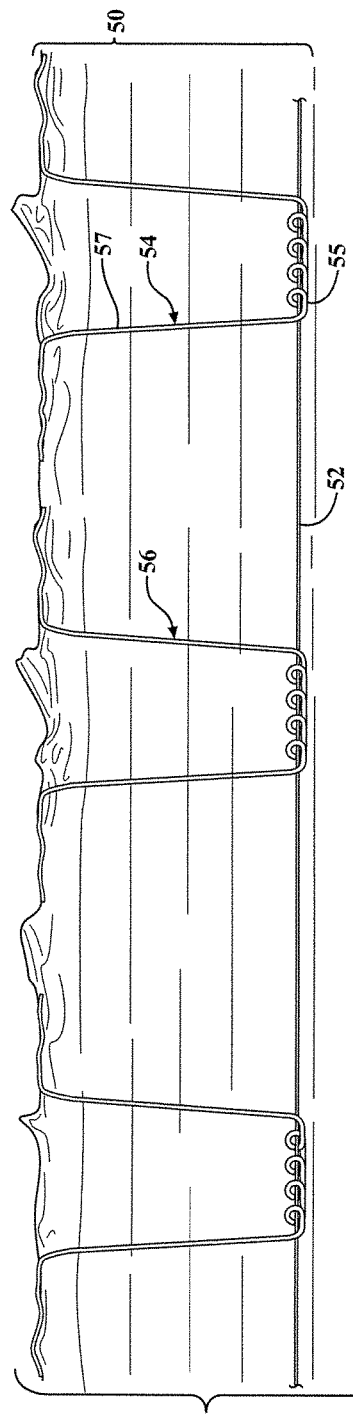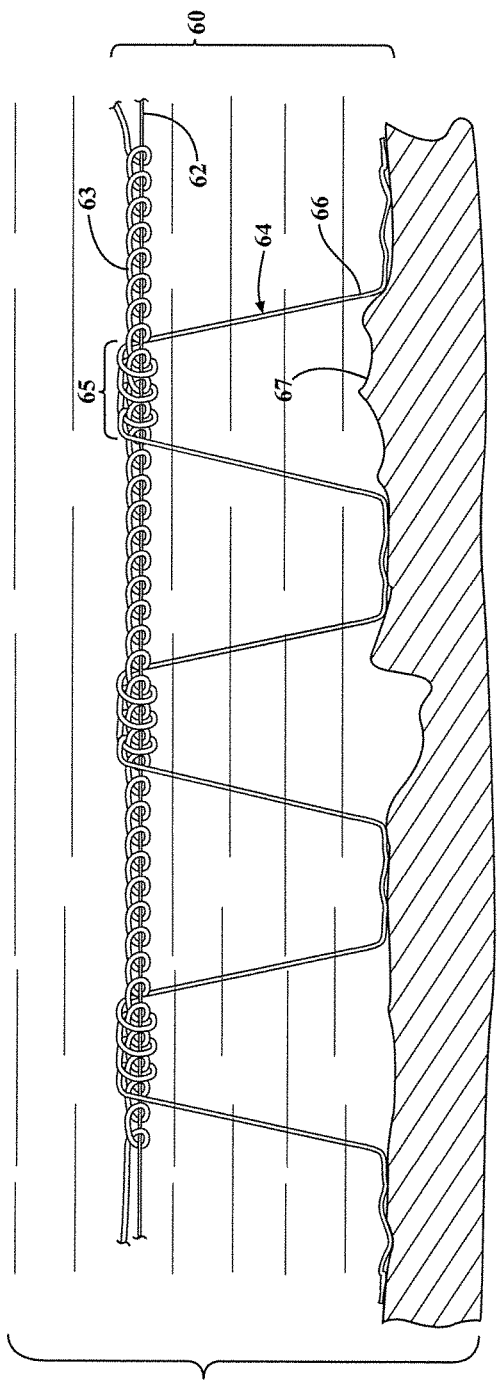

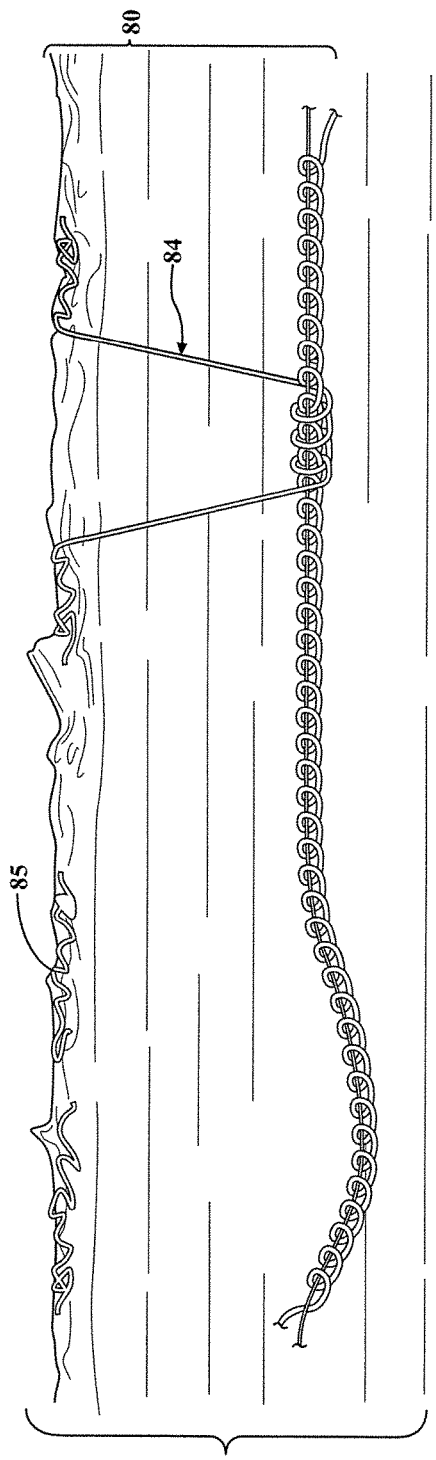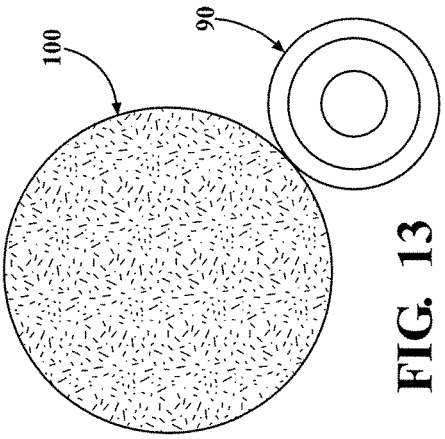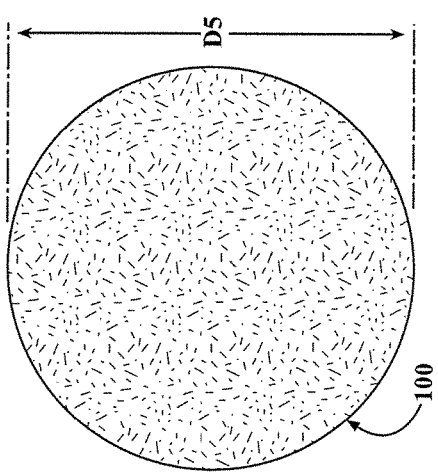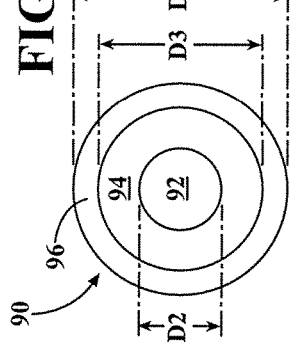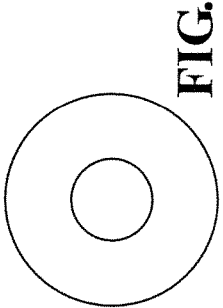

FIG. 17A
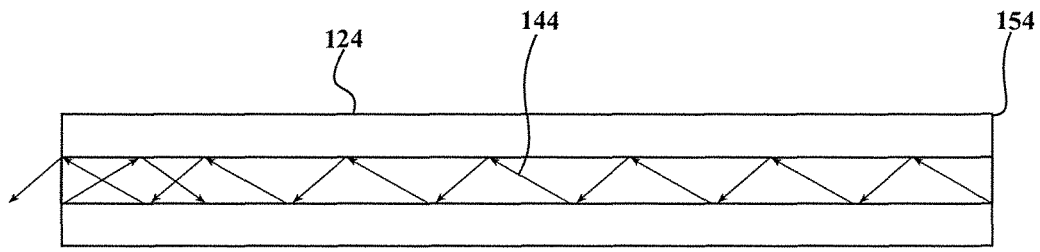
OTDR Trace
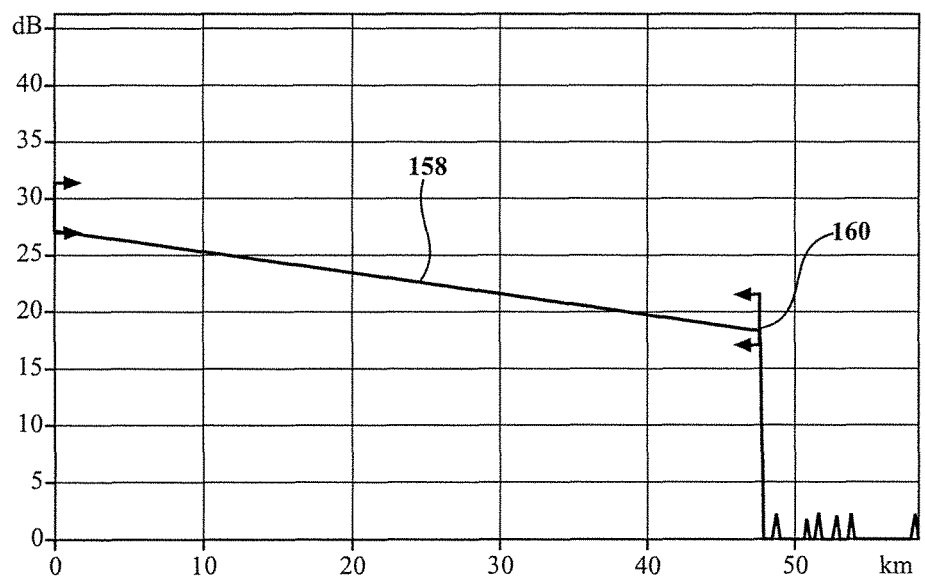
Event Table
| No. | Loc. (km)/Length | Event Type |
|---|---|---|
| 1 | 0.0000 | Launch Level |
|  | (47.6897 km) | Fiber Section |
| 2 | 47.6897 | Reflective Event |

FIG. 17B
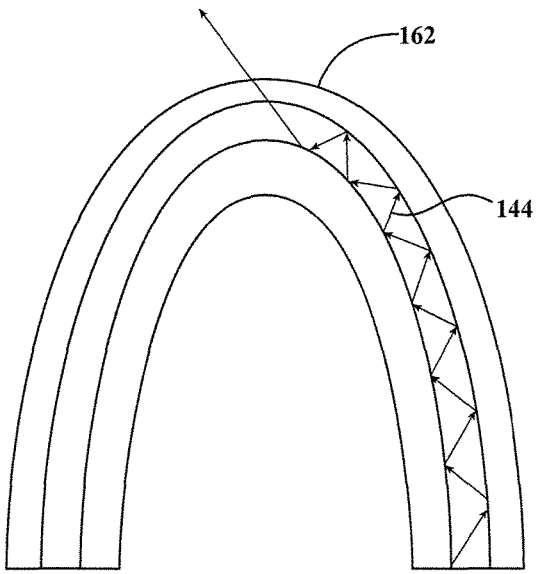
OTDR Trace
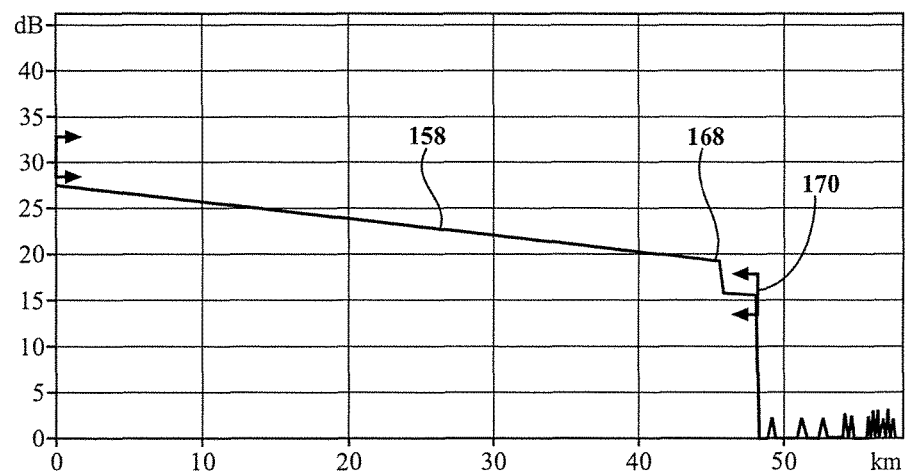
Event Table
| No. | Loc. (km)/Length | Event Type |
|---|---|---|
| 1 | 0.0000 | Launch Level |
|   | (0.0383 km) | Fiber Section |
| 2 | 0.0383 | Non-Reflective Event |
|   | (45.6582 km) | Fiber Section |
| 3 | 45.6965 | Non-Reflective Event |
|   | (2.5139 km) | Fiber Section |
| 4 | 48.2104 | Revlective Event |
164 — (45.6582 km) Fiber Section
166 — 45.6965 Non-Reflective Event

INTRUSION DETECTION SYSTEM FOR AN UNDERSEA ENVIRONMENT

CROSS-REFERENCE TO RELATED APPLICATIONS

This application claims priority to U.S. provisional patent application No. 62/237,770, filed Oct. 6, 2015. This application is also a continuation-in-part of U.S. patent application Ser. No. 15/268,769, filed Sep. 19, 2016, which is a continuation-in-part of application Ser. No. 14/319,232, filed Jun. 30, 2014, which claim the benefit of U.S. provisional application 61/957,421, filed Jul. 2, 2013. This application is also a continuation-in-part of U.S. patent application Ser. No. 14/319,232, which claims priority to U.S. provisional patent application No. 61/957,421, filed Jul. 2, 2013. The entire contents of each application are incorporated herein by reference.

FIELD OF THE INVENTION

This invention is directed to devices using fiber optical cable in an undersea environment as an intrusion detection system, and more specifically to methods for detecting disturbances over long distances using fiber optics suspended in the water column away from both the surface and the bottom.

BACKGROUND OF THE INVENTION

Current intrusion detection systems use fiber optical cables with added sensing devices along the length of the cable. The fiber cables are usually greater than a half inch in diameter, have significant strength members/coatings, and often include electrical power wires. These suspended optical fibers usually weigh more that 10 pounds per mile and can be quite expensive due to their significant construction. Further, the deployment of suspended optical fibers requires special fiber-optic-laying ships with high specialized, and very expensive, services. Finally, to transform the suspended optical fiber into an intrusion sensor requires dedicated sensing devices to be inserted/connected along the length of the cable and/or at end points of the cable. These dedicated, expensive, and discrete sensor can monitor acoustic disturbances over long distances (distances greater than 25 miles), such as along a pipeline or trans-oceanic distances along the sea floor between two landmasses, with a first suspended optical fiber connected to a remote sensing unit. The remote sensing unit receives an optical return signal, created by the acoustic disturbance, and generates a representative signal having features of the optical return signal. The representative signal is transmitted to an analysis engine for monitoring. Further, the suspended optical fiber requires a plurality of regenerators to prevent signal loss over long distances, as disclosed in U.S. Pat. No. 8,937,713. Alternatively, intrusion detection systems using fiber optical cables can monitor a disturbance (e.g. acoustic pressure, mechanical pressure, or thermal strain) over distances greater than 3 miles, in which a single mode or multimode suspended optical fiber is connected to a time-domain reflectometer. The suspended optical fiber is deformed by the disturbance at a plurality of locations, thereby creating optical return signals relative to the locations at which the disturbance occurred, as disclosed in U.S. Pat. No. 7,274,441.

SUMMARY OF THE INVENTION

This invention provides a low cost way to create and deploy, continuous, very long, intrusion detection system with a suspended raw optical fiber; instead of using a composite cable, only the raw optical fiber without any other cable components is used. By using only the raw fiber optic, a very long, continuous, suspended, physical sensor can be created and deployed to monitor acoustic and mechanical disturbances over long distances. Additionally, the present intrusion detection system localizes the acoustic or mechanical disturbance and classifies the precise type of disturbance based upon parameters of the optical return signal.

An intrusion detection system for determining a location and type of a disturbance in an underwater environment can include a raw optical fiber that is suspended in the water column, with the raw optical fiber connected to a mooring at a first end, an optical time-domain reflectometer, and the optical fiber having at least one terminal end. In a preferred embodiment, the mooring can be a submersible buoy and the optical time-domain reflectometer may be a component located on the submersible buoy. In an alternative embodiment, the mooring can be an anchor mooring. The terminal end of the suspended optical fiber might be a free end, or it might be connected to a second mooring.

The optical time-domain reflectometer includes a light source that is operable to emit an optical pulse of light into the suspended optical fiber from an origin location toward the terminal end of the raw fiber optic. The optical time-domain reflectometer is connected to the suspended optical fiber at the origin location. The optical time-domain reflectometer can be positioned at a first end of the fiber optic. Or alternatively, the optical time-domain reflectometer can be positioned at an intermediate position along the fiber optic strand. The optical time-domain reflectometer can further include a processor operable to receive an optical return signal from the terminal end of the fiber optic line. Or alternatively, the processor can receive an optical return signal from a deformation created by the disturbance to the suspended optical fiber. The processor is further operable to determine a location of the disturbance based on a time to receive the optical return signal. Additionally, the processor is operable to determine the type of the disturbance based on a magnitude of the optical return signal. In a preferred embodiment, the suspended optical fiber is a composite raw optical fiber strand with a length between 1 and 120 miles. Additionally, the suspended raw optical fiber can be one of a plurality of composite or coated suspended optical fibers.

A method of determining a location and a type of disturbance in an underwater environment is provided, including the steps of emitting a pulse of light into an origin location of a suspended optical fiber and receiving, using an optical time-domain reflectometer, a reflected pulse of light as an optical return signal through the suspended optical fiber. The optical return signal can be caused by a terminal end of the suspended optical fiber or by a deformation to the suspended optical fiber, with the deformation created by an acoustic or mechanical disturbance. Additionally, the method of determine the location and type of disturbance in the underwater environment can include analyzing, with a processor, a plurality of parameters of the optical return signal including at least a time to receive the reflected pulse of light, and a magnitude of the reflected pulse of light. The method further comprises quantifying parameters of the acoustic or mechanical disturbance including at least the type and location of the mechanical or acoustic disturbance based on the analysis of the reflected pulse of light. This analysis can include at least the time to receive the reflected pulse of light, and the magnitude of the reflected pulse of light.

BRIEF DESCRIPTION OF THE DRAWINGS

FIG. 5 is a view of a further composite cable assembly in accordance with an embodiment of present invention;

FIG. 6 is a view of another composite cable assembly in accordance with an embodiment of present invention;

FIG. 9 is a view of a composite cable assembly in which a supplemental filament has become detached;

FIG. 10 is a cross-sectional view of an exemplary raw optical fiber;

FIG. 11 is a cross-sectional view of an exemplary supplemental filament for use with the present invention;

FIG. 12 is a cross-sectional view of an alternative supplemental filament for use with the present invention;

FIG. 13 is a cross-sectional view of an optical fiber with a supplemental filament disposed adjacent the outer surface of the optical fiber;

FIGS. 17A and 17B illustrate sample optical time-domain reflectometer traces generated by an optical return signal highlighting a deformation in the fiber optic.

DETAILED DESCRIPTION OF THE INVENTION

The present invention provides a composite assembly adapted for use in a fluid environment, where an elongated element, such as an optical fiber, having a first buoyancy in a fluid environment and a supplemental filament having second buoyancy different from the first buoyance are connected to one another along their lengths so as to form a composite assembly with a composite buoyancy that is functionally controllable in the fluid environment, allowing the composite assembly to be suspended between an upper and lower boundary of the fluid environment. The composite buoyancy may be generally neutral or positive. In an embodiment, the composite buoyance may also be negative such that the composite assembly sinks at a very slow rate during the period of its intended use.

Such a composite assembly may include an elongated element that is a communication or signal carrying element, such as a raw optical fiber or a jacketed cable having at least one optical fiber surrounded by a jacket. This elongated element, on its own, may have a negative buoyancy in the fluid environment. A supplemental filament, such as a thread, may, on its own, have a positive buoyancy on the fluid environment. The elongated element in the supplemental filament are connected to one another along their lengths, such as by at least partially coiling the supplemental filament around the outer surface of the elongated element. By selecting a quantity of the supplemental filament per unit length of the elongated element, a composite assembly may be formed that is generally neutrally buoyant in the fluid environment.

As will be clear to those of skill in the art, the buoyancy of an element depends on the fluid environment. For example, salt water in the ocean is significantly denser than fresh water. The buoyancy of an element will depend both on its density as compared to the fluid environment and the amount of air that may be entrapped by an element. An element or assembly may be referred to herein as generally neutrally buoyant or functionally neutrally buoyant when that element or assembly may be suspended in the fluid environment between an upper and lower boundary of the fluid environment and the element or assembly will remain between the upper and lower boundaries for more than a trivial period of time. An assembly may be considered to be suspended between the upper and lower boundaries even where a disconnected portion of a supplemental filament extends to the upper or lower boundary. As known to those of skill in the art, the density of water, such a sea water, varies depending on location, depth, and other factors, and may change over time at a given location.

Figure 1:
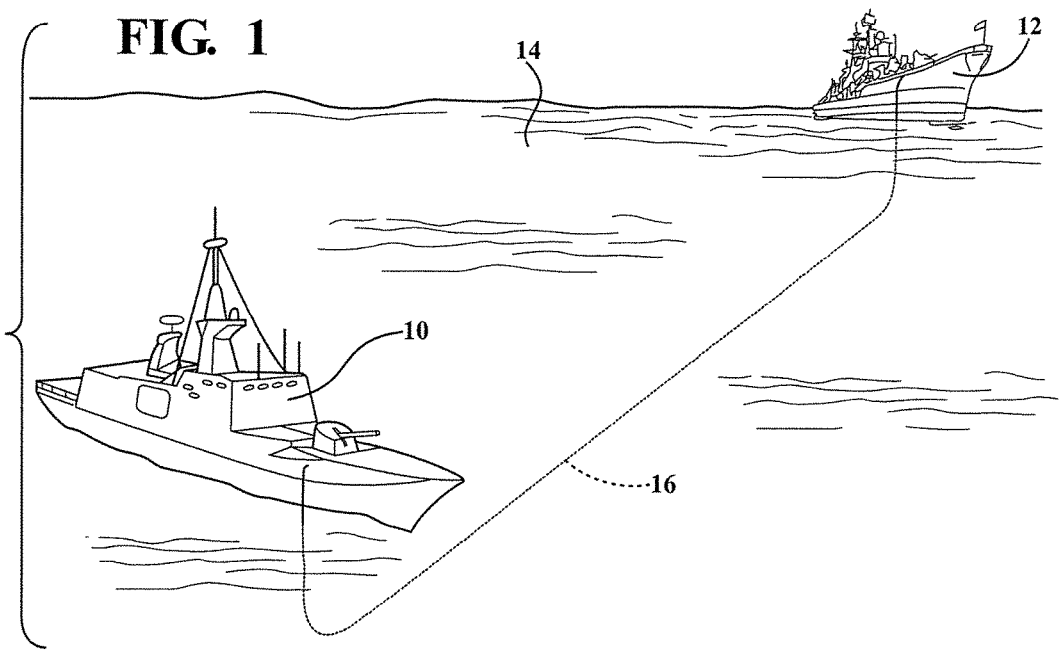
FIG. 1 is a perspective view of a pair of ships with a cable assembly in accordance with the present invention connecting the ships for communication purposes.

Referring now to FIG. 1, a first ship 10 and second ship 12 are shown on a body of water 14, representing a fluid environment. A composite communication assembly 16 is shown extending between the ships 10 and 12 and disposed below the surface of the fluid environment 14. This represents an exemplary application for an elongated composite assembly of the present invention as well as an embodiment of the present invention. Additional applications include communication between a ship and shore or communication between any two points separated by a fluid environment. A portion of the composite assembly may be stored on one of the ships and paid out or collected as necessary to establish and maintain communication. For example, the position of the ships or other points may change relative to each other, especially when a ship is under way.

Figure 2:
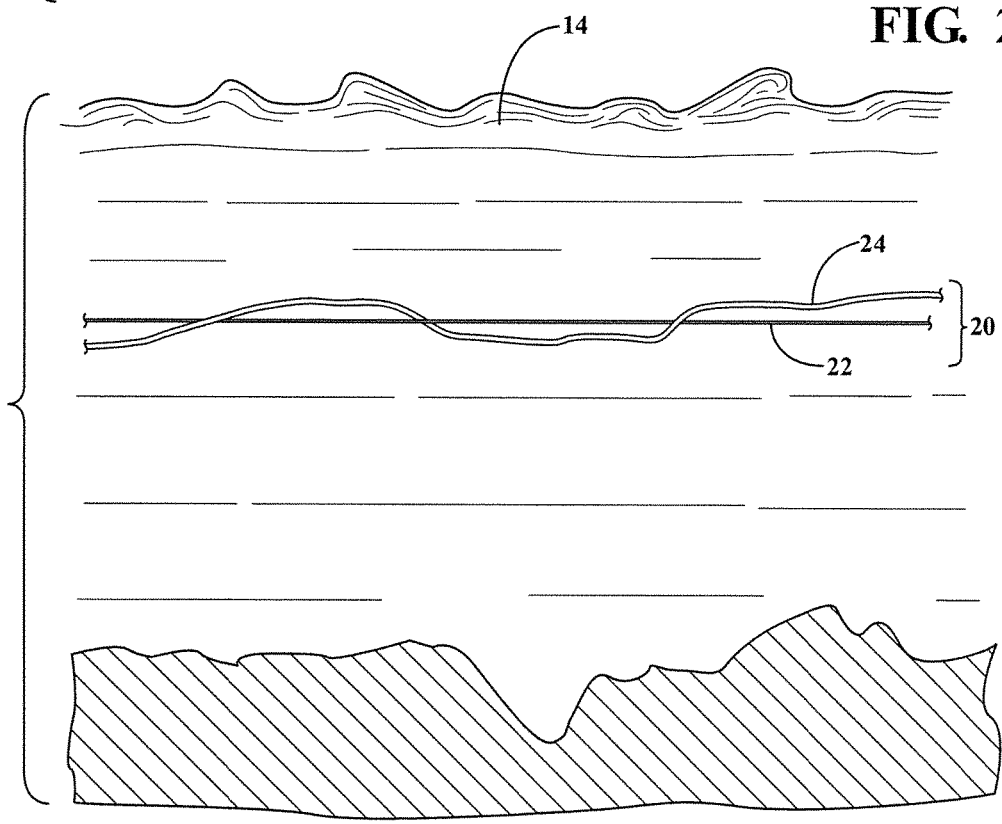
FIG. 2 is a view of an embodiment of an optical fiber assembly in accordance with an embodiment of the present invention.

FIG. 2 illustrates a first embodiment of the present invention wherein a composite cable assembly 20 is formed by interconnecting an elongated element 22 with an elongated supplemental filament 24. In the illustrated embodiment, the filament 24 is loosely coiled around the elongated element 22. In one example, the element 22 is an optical fiber having a negative buoyancy in the fluid environment 14. The supplemental filament 24 may be any elongated element with a positive buoyancy such that the combination of the optical fiber 22 and filament 24 create a composite assembly with a composite buoyancy that is generally neutral in the fluid environment 14.

Figure 3:
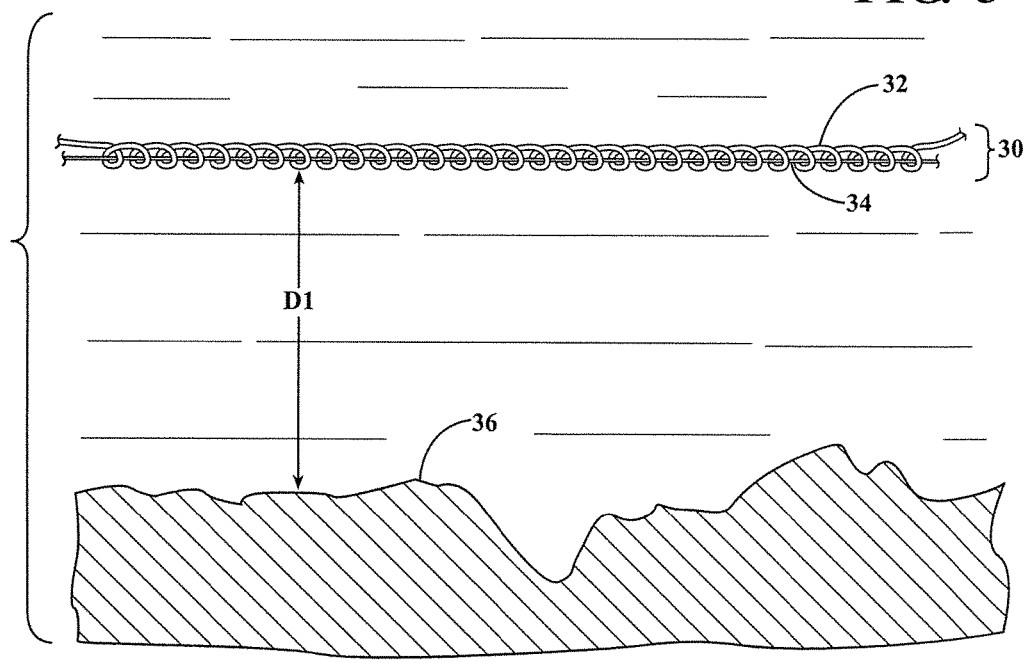
FIG. 3 is a view of another composite cable assembly in accordance with an embodiment of the present invention.

FIG. 3 illustrates a second embodiment of the present invention in which a composite assembly 30 includes an elongated element 32 and a supplemental filament 34. As shown, the supplemental filament 34 is coiled around the elongated element 32 with significantly more coils per unit length than in FIG. 2. As will be clear to those with skill in the art, the number of coils of filament per unit length of elongated element will depend on the relevant buoyancies of the element and filament as well as other factors. The assembly 30 is shown suspended in the fluid environment at a distance D1 above a lower boundary 36 of the fluid environment. While FIGS. 2 and 3 illustrate the elongated element and supplemental filament being interconnected by coiling the supplemental filament around the elongated element, numerous other approaches to connection may be used. For example, the elongated element may be partially coiled around the filament, the filament and elongated element may be glued together or the element and filament may be attached using connectors of any type, such as clips.

Figure 4:
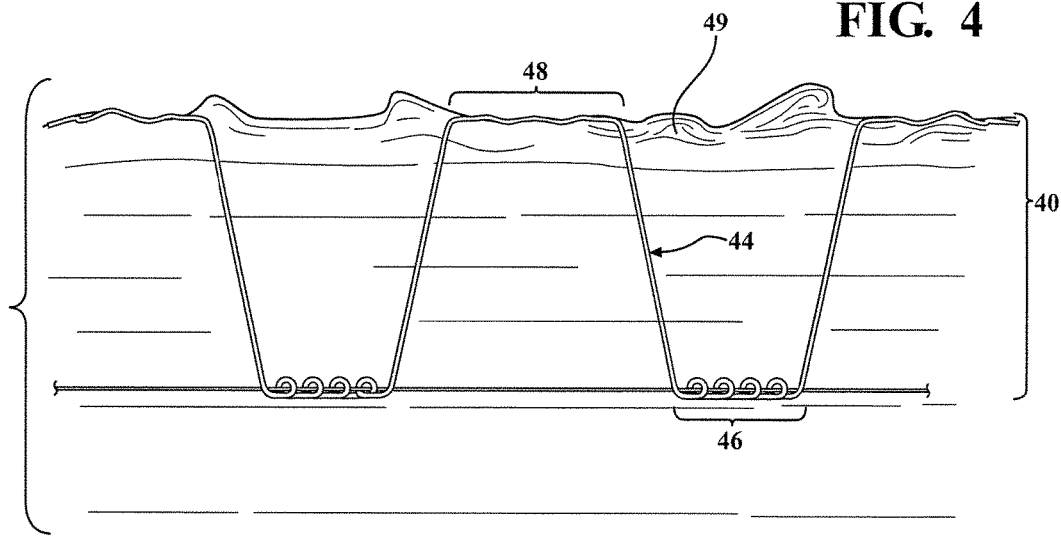
FIG. 4 is a view of another composite cable assembly in accordance with an embodiment of the present invention.

Referring now to FIG. 4, a third embodiment of the present invention is shown. Again, the composite assembly 40 includes an elongated element 42 and a supplemental filament 44. However, this embodiment differs in that the supplemental filament 44 includes connected portions 46 that are connected to the elongated element 42 and detached portions 48 that are not connected to the elongated element 42 such that the detached portions 48 may extend away from the elongated element 42 when in the fluid environment. In the illustrated embodiment, the filament 44 is continuous such that the connected portions 46 and detached portions 48 are part of the same elongated element. In the illustrated embodiment, part of the detached portion 48 extends to upper boundary 49 of the fluid environment and floats thereon. This may be referred to as a floating portion, and is a part of the detached portion. A transition portion extends between the floating portion and the connected portion 46 by extending downwardly in the fluid environment to the elongated element 42. Together, the floating portion and the transition portion make up the detached portion 48. The composite assembly 40 may be referred to as an assembly with self-compensating buoyancy. As will be clear to those with skill in the art, if the combined buoyancy of the elongated element 42 and the submerged portions of the filament 44 are positive, the elongated element 42 will rise towards the surface. This will allow an additional length of filament 44 to become part of the floating portion, thereby reducing the amount of filament 44 that is submerged and reducing the composite buoyancy of the submerged portions of the composite assembly 40. If the combined buoyancy of the elongated element 42 and the submerged portions of the filament 44 is negative, the elongated element 42 will sink, causing additional filament 44 to be submerged. Put another way, the total amount of filament making up the floating portion and the transition portion will stay the same, but some of the floating portion will become transition portion or vice versa. This will continue until such time as the composite buoyancy of the elongated element and the submerged portions of the filament reach neutral or positive buoyancy with respect to the surrounding fluid environment, at which point the elongated element 42 will stabilize or rise. As will be clear who are skilled in the art, by selecting the relative buoyancy of the elongated element 42 and filament 44, and the amount of filament 44 that is detached, the approximate distance below the surface may be chosen.

FIG. 5 shows a fourth embodiment of the present invention. This embodiment differs from the third embodiment in that the supplemental filament takes the form of filament segments 54 and 56 that are spaced apart along the length of the elongated element 52. Each filament segment has a connected portion 55 that is connected to the elongated element 52, such as by being coiled around the element 52, and a disconnected portion 57 that may extend away from the elongated element 52 when in the fluid environment. The connected portion 55 and disconnected portion 57 are continuous with each other. As with the third embodiment, part of the disconnected portion extends to the upper surface of the fluid environment and floats thereon. Again, the distance at which the elongated element 52 is disposed below the surface may be selected by choosing the buoyancies of the component parts, the spacing between the segments 54 and 56, the quantity of filament per unit length of elongated element 52, and the amount of filament that is disconnected. It should also be noted that the amount of filament that may be disconnected may change over time, if the filament partially uncoils.

According to a further aspect of the present invention, the composite assembly may include more than one supplemental filament. For example, a first supplemental filament may have a positive buoyance while a second supplemental filament has negative buoyancy. Alternatively, both supplemental filaments may have a positive buoyancy or both may have a negative buoyancy. As one example, an optical fiber, having a negative buoyancy in a fluid environment, may have a first supplemental filament connected thereto with the first supplemental filament having a positive buoyancy. The quantity of filament per unit length of optical fiber may be chosen such so that the combination has a buoyancy close to neutral buoyancy in the fluid environment. A second supplemental filament may be connected to the elongated element so as to fine tune the overall buoyancy. For example, if the combination of the elongated element and first supplemental filament is slightly negative, the second filament may add enough buoyancy so as to provide an overall neutral buoyancy. Alternatively, if the elongated element and first supplemental filament have a combined slightly positive buoyancy, the second filament may have a negative buoyancy such that the overall assembly has a neutral buoyancy.

FIG. 6 illustrates a fifth embodiment of the present invention. A composite assembly 60 includes an elongated element 62, such as an optical fiber, a first supplemental filament 63 that is connected to the elongated element 62 by being coiled thereabout, and a second supplemental filament 64 that has connected portions 65 connected to the elongated element 62 and detached portions 66 that are not connected and can therefore extend away from the elongated element 62 in the fluid environment. In the illustrated embodiment, the second supplemental filament 64 has a negative buoyancy such that the detached portion 66 extend downwardly to a lower boundary 67 on the fluid environment. The composite assembly 60 functions similarly to the embodiment of FIGS. 4 and 5, in that the elongated element 62 will rise or fall until the effective buoyancy of the overall assembly stabilizes. The part of the second supplemental filament that is disposed on the lower boundary 67 of the fluid environment may be referred to as a supported portion and the part that extends from the lower boundary to the elongated element as a transition portion.

Figure 7:
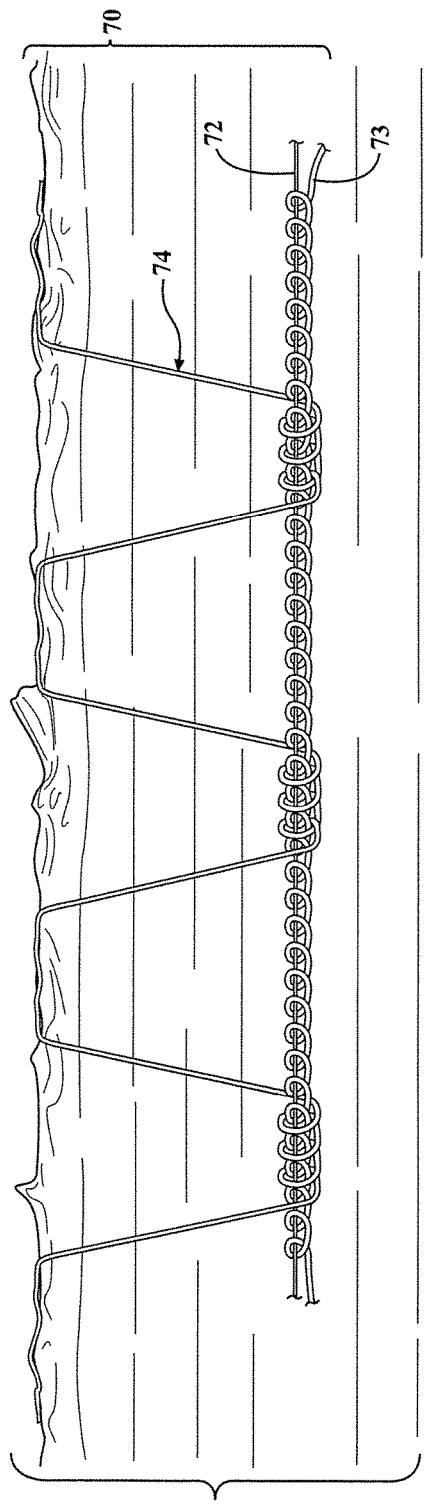
FIG. 7 is a view of a further composite cable assembly in accordance with the present invention.

FIG. 7 shows a sixth embodiment of the present invention. A composite assembly 70 includes an elongated element 72, a first supplemental filament 73, and a second supplemental filament 74. This embodiment differs from the embodiment in FIG. 6 in that the combination of the elongated element 72 and first supplemental filament 73 is negative while the supplemental filament 74 has a positive buoyancy and has disconnected portions that extend upwardly to the upper boundary of the fluid environment.

Figure 8:
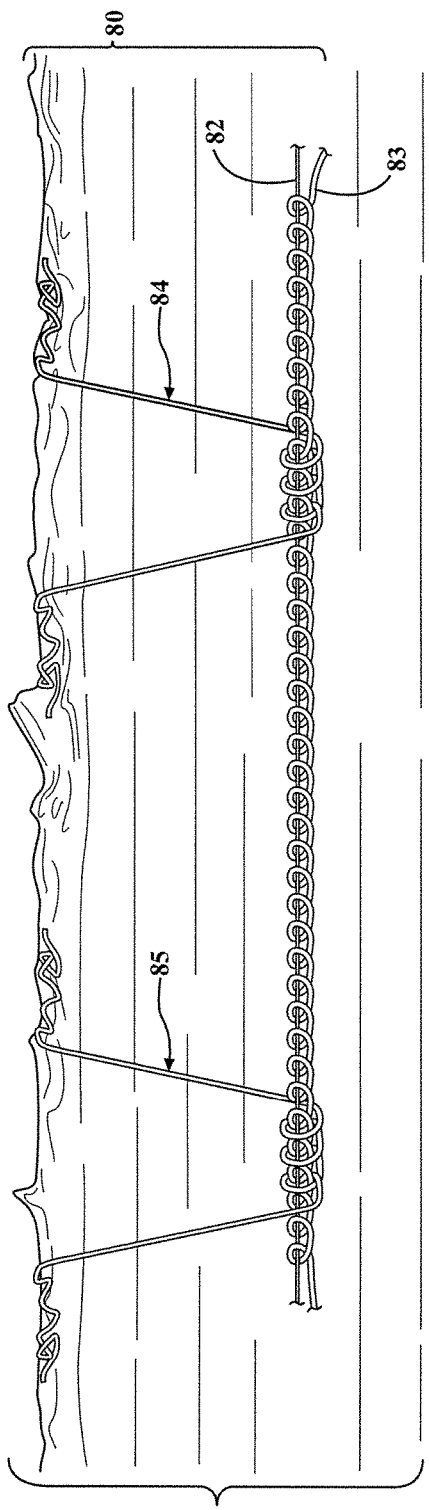
FIG. 8 is a view of yet another composite cable assembly in accordance with an embodiment of the present invention.

FIG. 8 illustrates the seventh embodiment of a composite assembly 80 including an elongated element 82, a first supplemental filament 83, and a second supplemental filament that takes the form of filament segments 84 and 85.

FIG. 9 illustrates an exemplary operation of the embodiment of FIG. 8 in which the filament in segment 85 has become detached from the remainder of the assembly 80. As shown, part of the composite assembly will then sink downwardly. However, adjacent segments, as such as 84, will compensate allowing the overall composite assembly 80 to continue to function. In a further version of the invention, a supplemental filament may be provided with disconnected portions extending upwardly (positively buoyant) and another supplemental filament may be provided with disconnected portions extending downwardly (negatively buoyant).

A composite assembly in accordance with the present invention may take a variety of forms. In some embodiments, the elongated element is a communication or signal carrying element such as an optical fiber cable. However, the present invention also contemplates other types of elongated elements wherein functionally neutral buoyancy is desirable. Examples include other types of elongated communication carrying elements such as wires and cables.

In embodiments of the present invention wherein the elongated element is an optical fiber cable, this optical fiber cable may be either a "raw" fiber or a jacketed cable having at least one optical fiber surrounded by the jacket. The use of raw fiber is advantageous for some embodiments in that this fiber is less expensive and bulky than jacketed or other types of cables. As known to those with skill in the art, optical fiber typically consists of a core and a cladding with the interface between the core and cladding providing a reflective barrier for containing the optical signal. In some types of optical fiber, the core and cladding are both formed of glass. A coating or jacket may be provided over the cladding to provide some protection. As used herein, a "raw" optical fiber may mean an optical core, an optical core with cladding, or an optical core, cladding and jacket wherein the jacket is applied directly to the cladding.

FIG. 10 illustrates a cross-sectional view of an exemplary raw optical fiber 90. The optical fiber 90 includes a core 92 surrounded by a cladding 94 which is covered with a coating or jacket 96. The relative dimensions of the components in FIG. 10 may not be representative of some optical fibers. Some raw optical fibers use an acrylate polymer or polyimide coating. One type of raw optical fiber that may be used with the present invention is Corning FMF-28. This is a glass optical fiber having a core, a cladding and a coating. The core 92 may have a diameter D2 of 8.2 microns, the cladding 94 may have a diameter D3 of 125 microns and the coating 96 may have a diameter D4 of 242 microns. Such a raw optical fiber may have a density approximately twice that of water, making it negatively buoyant.

In the description above, a "jacketed cable" was discussed, as one example of an elongated element for use with the present invention. As used herein, such a jacketed cable means a cable with at least one raw optical fiber, such as in FIG. 10, contained within a larger jacket. A jacketed cable may also be other types of cable having an outer jacket, such as communication cable. This larger jacket should not be confused with the coating 96 provided directly on the cladding of the raw optical fiber. This larger jacket forming the outer surface of the jacketed cable will typically include more than one raw optical fiber as well as additional elements such as for strengthening of the overall assembly. Such a jacketed cable may have a positive, neutral, or negative buoyancy, with the buoyancy being adjusted in accordance with the embodiments of the present invention. It is also noted that the embodiments of the present invention discussed herein do not have a jacket enclosing the supplemental filaments with the elongated element. Instead, the supplemental filaments are outside the elongated element and exposed to the surrounding fluid environment.

A supplemental filament used with the present invention may have a positive or negative buoyancy, depending on the buoyancy of the elongated element being supported in a fluid environment and whether the supplemental filament is a first or second supplemental filament. In one example, the supplemental filament is a positively buoyant thread. One example is a polypropylene thread formed of a plurality of tightly wound finer fibers. Such a thread is shown at 100 in FIG. 11. Examples include threads with a thread weight of 46, 69 or 96, though others may be used. In some versions, the density (specific gravity) of the polypropylene itself is approximately 0.9. However, a polypropylene thread formed of finer fibers traps air very tightly such that the composite density (specific gravity) of the polypropylene thread may approach 0.5 for mass produced thread. The material itself may have other densities and other composite densities, with the present invention not being limited to any specific densities. In some embodiments, the diameter D5 of the thread 100 is greater than the diameter D4 of the raw optical fiber. As one example, the diameter D5 is approximately three times the diameter D4. Other diameters may also be used, partially depending on the quantity of supplemental filament used per unit length of the raw optical fiber. Alternatively, a solid thread may be used. As a further alternative, a hollow thread may be used, such as shown at 102 in FIG. 12. A low density polyethylene (LDPE) thread may be used as a positive buoyancy element. Fishing line, such as formed of high density polyethylene (HDPE) may be used as a negative buoyancy element. It should be noted that the filament or filament segments used in embodiments of the present invention is preferably of consistent diameter and material along its length. The present invention is not limited to any specific filament diameter. FIG. 13 illustrates a cross-sectional view of a raw optical fiber 90 connected to a thread 100.

As discussed above, the present invention allows an elongated element to be suspended between an upper and lower boundary of a fluid environment. It should be understood that an elongated element, as this term is used herein, means an element that is very long, such as extending for multiple miles between a ship and a communication site. Such an elongated element may have a width, thickness or diameter that is very small relative to its overall length. Preferably the elongated element has a consistent diameter and construction along its length. An elongated filament for use with the present invention also has a width, thickness or diameter that is very small relative to its overall length. While the elongated element and filament are both illustrated as having a circular cross-section, other cross-sectional shapes may also be used.

Referring again to FIG. 1, the composite communication assembly 16 is shown disposed in the fluid environment and extending between the ships 10 and 12. Obviously, the assembly 16 at some point must be disposed into the fluid environment and extended from one ship to another point. This may be accomplished in a variety of ways. In one approach, the assembly is pre-assembled with the supplemental filament or filaments attached to the elongated element. This pre-assembled assembly may be stored such as on a spool and then dispensed into the fluid environment. In another approach, the elongated element and the supplemental filament or filaments are stored separately and assembled into the composite assembly as the component elements are dispensed. As another approach, an elongated element and a first supplemental filament are pre-assembled and a second supplemental filament is connected thereto as the assembly is dispensed. By assembling the composite assembly at the time of use, the amount of supplemental filament or filaments per unit length of the elongated element may be adjusted for the actual conditions. Supplemental filaments or filament segments may also be added after the composite assembly is in the fluid environment, to adjust performance. The illustrated embodiments show one or two supplemental filaments, but additional supplemental filaments may be used. Also, more than one type of filament segment may be used, such that some have different buoyancies than others.

The present invention further provides a disposable composite cable assembly adapted for use as an Above Bottom Fiber (ABF) in a fluid environment, such as an undersea communication transport. The disposable composite cable assembly includes an elongated element, such as a raw glass fiber which is negatively buoyant, covered with low-density materials with positive buoyancy. The low-density materials may be micro elements such as microspheres or non-micro materials such as Styrofoam balls.

Figure 15:
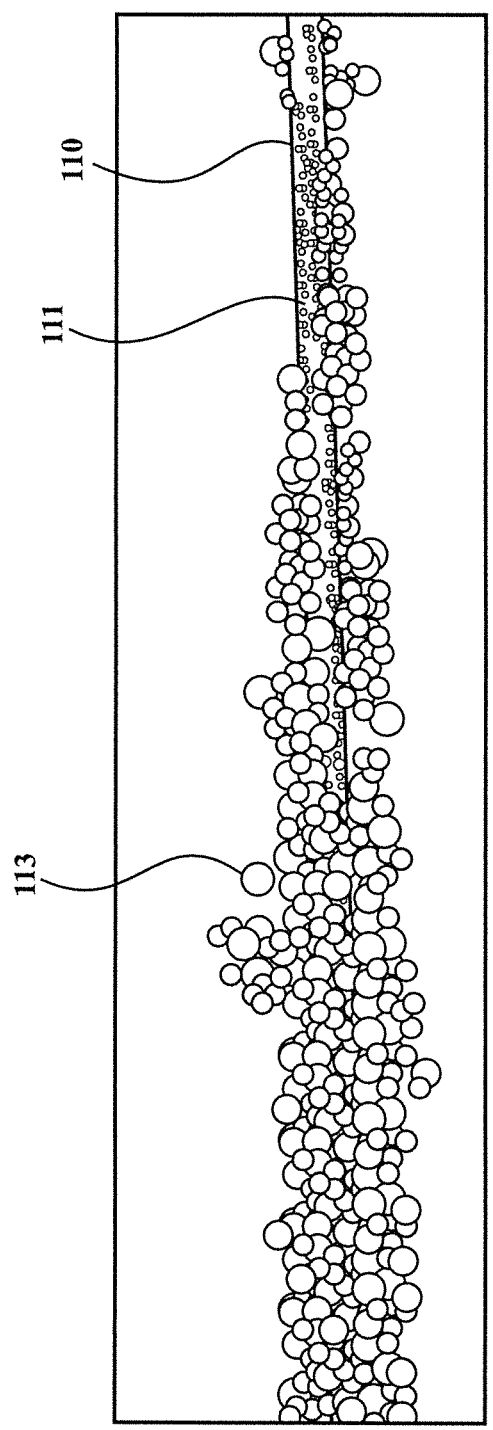
FIG. 15 is a zoomed-in view of a petroleum jelly & microsphere coated raw glass fiber in accordance with an embodiment of the present invention.

The low-density materials 113 may be mixed into a grease/gel-like substance 111, such as petroleum jelly, to cover the fiber 110. Alternatively, the fiber 110 may be lightly coated with weak adhesives 120 such as petroleum jelly and then covered with the low-density materials 113 such as flour-like microspheres, as shown in FIG. 15.

The low-density materials are positively buoyant. The floating low-density materials cause the coated fiber to float. The coating of the microspheres and the weak adhesives is inert to the fiber, and therefore does not change the surface chemistry of the fiber. Additionally, for certain embodiments, all of the components of the composite cable assembly are individually approved as environmentally-acceptable, including the low-density materials, the weak adhesives, and the fibers, thereby simplifying and lowering the cost of the process to change buoyancy.

The elongated element may be raw fibers or cables. Cables refer to coated or jacketed fibers. The present invention may be utilized with a fiber of any diameter, ranging from 10 microns to several centimeters. A single mode raw fiber is about 250 microns in diameter. The smallest fiber may be about 10-20 microns in diameter. A plastic fiber may be about 600 microns in diameter. The size of the microspheres is comparable to the fiber or cable which the microspheres are attached to. The microspheres range mostly from 10 to 100 microns, with a maximum at 250 microns, preferably 20-60 microns in diameter. The sizes of the microspheres are larger for larger fibers or cables.

In one embodiment, the fiber diameter is about 250 microns, while the microsphere diameter is about 150 microns. The microspheres may be 3M™ ceramic microspheres or Hy-Tech ThermaCels™ ceramic paint additives or microspheres which reside in toothpaste as a cleaning agent, as well as other microspheres.

Figure 14:
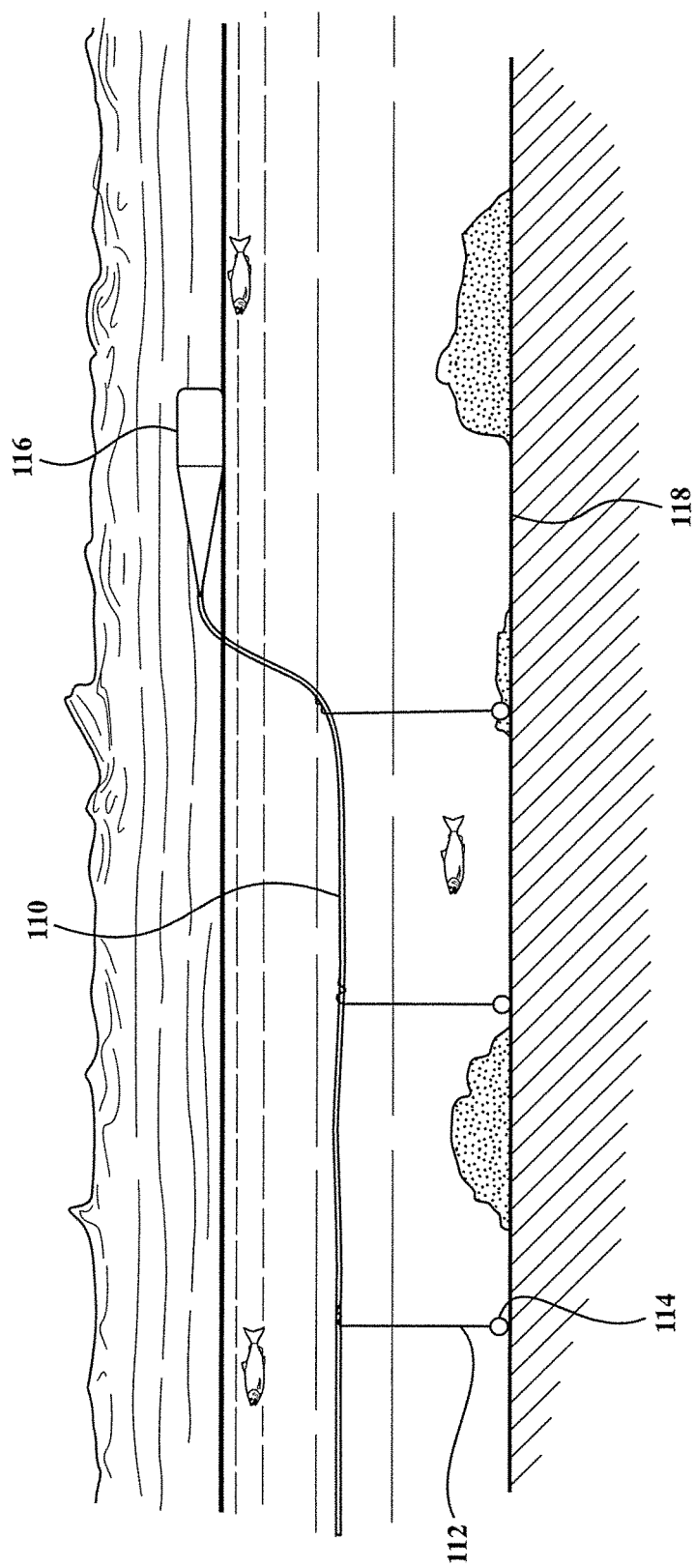
FIG. 14 is a view of a composite cable assembly suspended in an underwater environment in accordance with an embodiment of the present invention.

As shown in FIG. 14, anchor/dropper lines 112 may be periodically attached to the microsphere coated raw glass fiber 110. The raw glass fiber 110 is attached to a fiber spool and payout guide 116. The fiber spool and payout guide 116 is optional. The term "periodically" may mean at equal intervals or non-equal intervals. Anchor/dropper lines can be cotton threads. For example, fine cotton 11b test threads may be used. Anchor weights 112 are optional. The cotton threads may have tail ends coated with iron filings adhered with petroleum jelly. The tail ends may also be micro-wire/chain which rests at the bottom of the liquid environment 118.

The ABF design of the present invention results in all components except for the low-density materials such as the microspheres sinking to the bottom after use. As wave motion and biologics interact with the fiber, the microspheres will detach and float to the surface. When some percentage of the microspheres release, the entire system will become negatively buoyant and all elements will sink to the bottom. Raw fiber optic near the bottom as well as fine biodegradable cotton is broken apart by biologics and currents that move the fiber over coral and sharp rocks. Since the raw fiber is nearly 100% pure silicon, it essentially breaks down into sand. Slowly dissolving/corroding anchor weights hold the fiber in place during the period before they completely dissolve. Adhesive selection can be organic and can dissolve.

The suspension depth and the sink rate of the ABF before the components start to sink to the bottom and dissolve can be controlled by using different types of the adhesives or different size of the microspheres. The weight of the fiber, anchor lines and the optional anchor weights are factors too. For example, for a fiber with a diameter of less than 250 microns, there are less than 4 in3 and less than 4 ounces of fiber per mile, less than 0.5 in3 and less than 0.2 ounces of petroleum jelly is needed to attach less than 0.5 in3 and less than 0.2 ounces of ceramic microspheres to the fiber which is necessary to keep the assembly float. Much less cotton thread than the fiber is needed. For example, for a mile of fiber, less than 0.5 in3 and less than 0.3 ounces of cotton 11b test thread as well as optional corroding weights of less than 0.2 in3 and less than 0.3 ounces may be used. Only the fiber is continuous. The ceramic microspheres as well as adhesives may be coated to the fiber surface continuously or periodically.

Other than being disposable, certain embodiments of the above bottom fiber of the present invention provides additional benefits such as its low cost, reliability, low SWaP, high gbps throughput and rapid replaceability.

Figure 16:
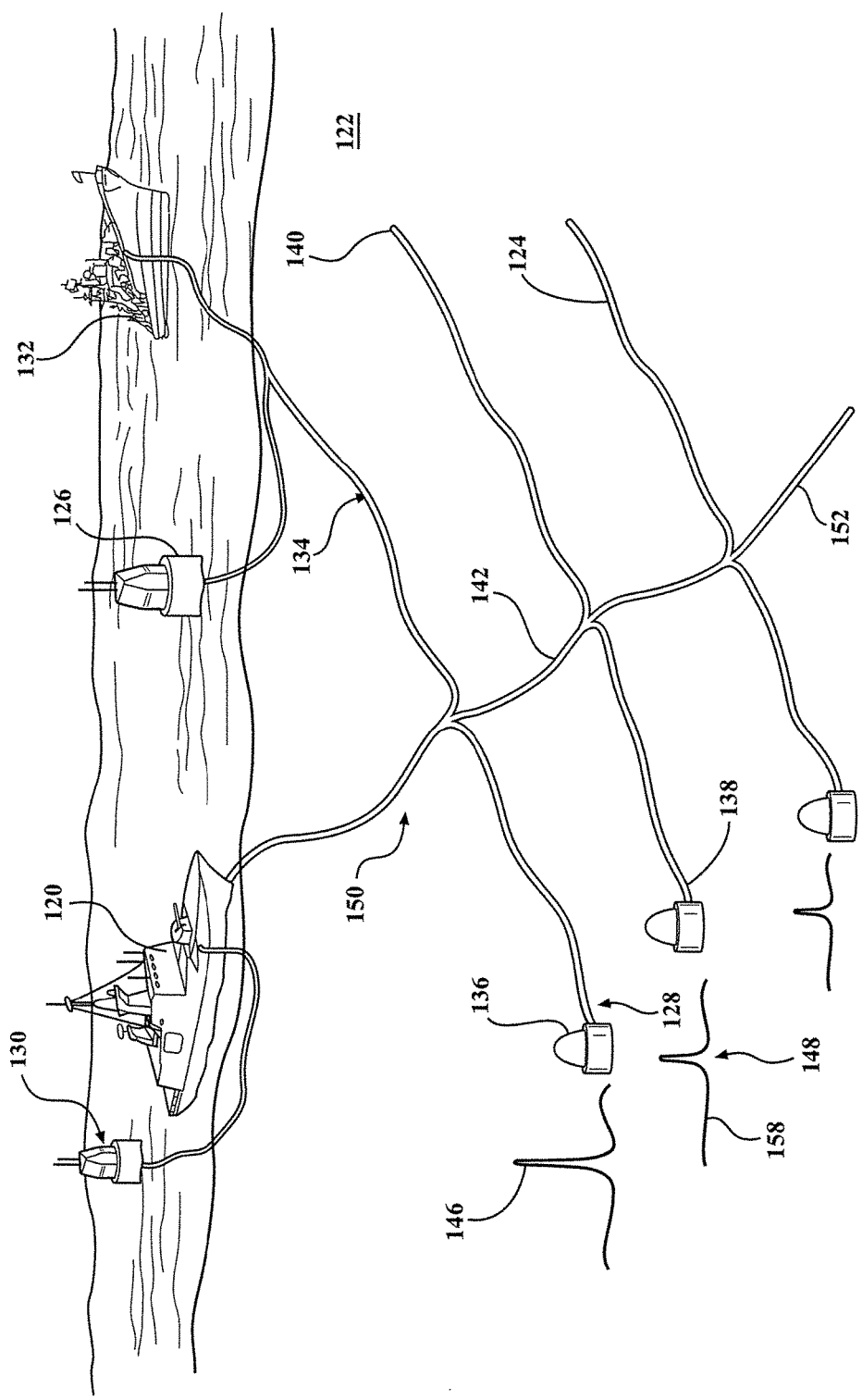
FIG. 16 is a perspective view of a buoy having an intrusion detection system and the fiber optic in accordance with the present invention.

Referring to FIG. 16, an embodiment of an intrusion detection system is shown. The intrusion detection system determines a three-dimensional location of a disturbance 120 in an underwater environment 122. The disturbance 120 can be any type of disturbance, including but not limited to an acoustic disturbance (sound wave) or a mechanical disturbance (boat, submarine, large underwater creature, turbulent ocean). For demonstration purposes only, FIG. 16 has the disturbance 120 as a boat. The intrusion detection system comprises an optical fiber 124 that is suspended in the water column, such as any of the embodiments discussed previously. The optical fiber 124 with water-column suspension can be submerged in the underwater environment 122 at various depths as needed. The suspended optical fiber 124 allows it to be submerged across a wide range of depths, including but not limited to depths close to the surface of the underwater environment 122, intermediate depths in the underwater environment 122, and further to the bottom of the underwater environment 122. Suspended optical fibers are shown at three depths or three locations in FIG. 16. A suspended optical fiber can be connected to a mooring 126 at a first end. The mooring 126 can be any apparatus able to withstand an aquatic or underwater environment that is able to be affixed to the first end of the optical fiber. For illustrative purposes only, the mooring 126 is shown as a floating buoy, another of which is shown at 130. This is not intended to limit the scope of the current invention. The mooring 126 can also be an anchor, submersible buoy, boat, seaworthy box, or any other apparatus known to those skilled in the art. Additionally, the suspended optical fiber 124 can be connected to second mooring. For illustrative purposes only, the second mooring is shown to be a boat 132. However, the second mooring can also be an anchor, submersible buoy, boat, seaworthy box, or any other apparatus known to those skilled in the art. In the alternative, the suspended optical fiber 124 can lack the second mooring, thereby having a free end 134. The suspended optical fiber 124 is connected to an optical time-domain reflectometer 136. Further, the suspended optical fiber 124 can be one of a plurality of suspended optical fibers.

The optical time-domain reflectometer 136, which will be described in detail later, emits a pulse of light into the suspended optical fiber 124 via an origin location 138 of the suspended optical fiber 124, with the pulse of light traveling down the suspended optical fiber 124 toward a terminal end 140 of the suspended optical fiber 124. The suspended optical fiber 124 can be any length between 1 and 120 miles, with the only limitation being a maximal distance that the pulse of light can travel down the suspended optical fiber 124 without appreciable degradation of the pulse of light.

A deformation 142 in the suspended optical fiber 124, created by the disturbance, such as a cable towed by ship 120, results in an optical return signal 144 being generated (see FIG. 17B). The optical return signal 144, which will be described in detail later, is received by the optical time-domain reflectometer 136. Parameters including but not limited to time to receive the optical return signal 144, magnitude 146 of the optical return signal, and overall waveform shape 148 of the optical return signal 144, are analyzed by the optical time-domain reflectometer 136. Based on the analysis of the plurality of parameters, a location 150 of the deformation 142, a direction (heading) 152 traveled by the deformation 142, along with a classification (type of acoustic or mechanical disturbance) of deformation 142, can be determined.

Referring to FIGS. 17A and 17B, sample optical time-domain reflectometer traces generated by the optical return signal 144 resulting from deformation 142 in the suspended optical fiber 124 are shown. FIG. 17A illustrates a situation in which the deformation 142 is a complete break 154 to the suspended optical fiber 124 caused by a fishing line, anchor line or the like. The optical time-domain reflectometer 136 emits a pulse of light into the suspended optical fiber 124 from the origin location 138 of the suspended optical fiber 124. The origin location 138 is the location at which the optical time-domain reflectometer 136 connects to the suspended optical fiber 124. The optical time-domain reflectometer 136 can be connected to the suspended optical fiber 124 at an end of the suspended optical fiber 124. Alternatively, the optical time-domain reflectometer 136 can be connected to the suspended optical fiber 124 at an intermediate location along the suspended optical fiber 124. The pulse of light travels down the suspended optical fiber toward the terminal end 140 of the suspended optical fiber 124. As is shown in FIG. 17A, the pulse of light can encounter a deformation such as the complete break 154 in the suspended optical fiber 124. As the pulse of light reaches the complete break 154 in the suspended optical fiber 124, the optical return signal 144 is reflected back by the complete break 154. The optical return signal 144 is received by a processor (not shown), which is a component of the optical time-domain reflectometer 136. As shown in FIG. 16, parameters including but not limited to time to receive the optical return signal 144, magnitude 146 of the optical return signal, and overall waveform shape 148 of the optical return signal 144, are analyzed by the processor in the optical time-domain reflectometer 136. An optical time-domain reflectometer trace 158 highlighting the pulse of light and various deformations, illustrated by assorted optical return signals, is created. The optical time-domain reflectometer trace 158 shows a location 156 of the complete break 154 in the suspended optical fiber 124, as determined by a reflection point 160. Because of the nature of the deformation (complete break), the reflection point 160 is a single event.

In comparison, FIG. 17B illustrates a situation in which the deformation 142 is a bend 162 to the suspended optical fiber 124 caused by a boat, submarine, large underwater creature or the like. The optical time-domain reflectometer trace 158 illustrates a location 164, 166 of the bend 162 by analysis of a plurality of reflection points 168, 170. The size of the reflection points, distance between adjacent reflection points, and the like are factors used by the processor of the optical time-domain reflectometer 136 to determine the type of disturbance 120 that created the bend 162 in the suspended optical fiber 124.

In the absence of the deformations in the suspended optical fiber 124, the terminal end 140 of the suspended optical fiber 124 generates the optical return signal 144.

Based on analysis of the plurality of parameters by the processor of the optical time-domain reflectometer 136, the location 150 of the disturbance 120, the direction (heading) 152 traveled by the disturbance 120, along with the classification (type of acoustic or mechanical disturbance) of disturbance 120, can be determined.

As will be clear to those with skill in the art, the herein illustrated and described embodiments of the present invention may be altered in various ways without departing from the scope or teaching of the present invention. It is the following claims, including all equivalents, which define the scope of the present invention.

I claim:

1. An intrusion detection system for determining a location and type of a disturbance in an underwater environment, the intrusion detection system comprising:
    a suspended optical fiber having a generally neutral or positive buoyancy and suspended in the underwater environment, the suspended optical fiber having a first end and at least one terminal end, the suspended optical fiber connected to a mooring at the first end of the suspended optical fiber, the optical fiber being free-floating at locations between the first end and the at least one terminal end, the optical fiber being a raw optical fiber including a core, a cladding and a coating or a core and a cladding; and
    an optical time-domain reflectometer connected to the suspended optical fiber at an origin location, the optical time-domain reflectometer comprising:
    a light source operable to emit an optical pulse of light into the suspended optical fiber from the origin location toward the at least one terminal end of the suspended optical fiber, and
    a processor operable to receive an optical return signal from the at least one terminal end of the suspended optical fiber or from a deformation created by the disturbance to the suspended optical fiber, the processor further operable to determine a location and a type of the disturbance based on an analysis of a time to receive the optical return signal, a magnitude of the optical return signal and a waveform shape of the optical return signal;
    whereby a continuous suspended sensor is formed and sensing is for detection of the intrusion or disturbance in the underwater environment and is continuous along the entire length of the optical fiber.

2. The intrusion detection system of claim 1, wherein the suspended optical fiber is a composite suspended optical fiber with a length between 1 and 120 miles.

3. The intrusion detection system of claim 1, wherein the mooring is a submersible buoy.

4. The intrusion detection system of claim 3, wherein the optical time-domain reflectometer is a component located on the submersible buoy.

5. The intrusion detection system of claim 1, wherein the mooring is an anchor mooring.

6. The intrusion detection system of claim 1, wherein the optical time-domain reflectometer is positioned at the first end of the suspended optical fiber.

7. The intrusion detection system of claim 1, wherein the optical time-domain reflectometer is positioned at an intermediate location along the suspended optical fiber.

8. The intrusion detection system of claim 1, wherein the suspended optical fiber is one of a plurality of suspended optical fibers.

9. The intrusion detection system of claim 1, wherein the terminal end of the suspended optical fiber is a free end.

10. The intrusion detection system of claim 1, wherein the suspended optical fiber is connected to a second mooring.

11. The intrusion detection system of claim 1, wherein the second mooring is connected to the terminal end.

12. The intrusion detection system of claim 1, wherein a plurality of reflection points are analyzed to determine the type of the disturbance.

13. A method of determining a location and a type of disturbance in an underwater environment, comprising the steps of:
providing a continuous sensor, the continuous sensor being a raw optical fiber including a core, a cladding and a coating or a core and a cladding, the optical fiber having a first end and a terminal end;
suspending the optical fiber in the underwater environment, such that the optical fiber is free-floating at locations between the first end and the terminal end; and
sensing a location and a type of the intrusion or disturbance in the underwater environment by:
emitting a pulse of light using a light source of an optical time-domain reflectometer into an origin location of the suspended optical fiber, wherein the optical time-domain reflectometer is connected to the suspended optical fiber at the origin location;
receiving, using the optical time-domain reflectometer, a reflected pulse of light as an optical return signal through the suspended optical fiber, wherein the optical return signal is caused by a deformation to the suspended optical fiber, with the deformation to the suspended optical fiber created by a disturbance; and
determining, with a processor of the optical time-domain reflectometer, the location and the type of the disturbance by analyzing a plurality of parameters of the optical return signal including at least a time to receive the reflected pulse of light and a magnitude of the reflected pulse of light,
whereby the sensing is along the entire length of the optical fiber.

14. The method of claim 13, wherein the disturbance is acoustic or mechanical.

15. The method of claim 13, further comprising the step of attaching buoyancy elements to the raw optical fiber such that the raw optical fiber is suspended in the underwater environment.

16. The method of claim 15, wherein the buoyance elements are micro particles, a micro particle defined as a particle having a maximum dimension of about 250 microns.

17. The method of claim 16, wherein the micro particles are microspheres.

18. The method of claim 16, wherein the micro particles are coated on an outer surface of the raw optical fiber by an adhesive, the micro particles being in direct contact with the adhesive.

19. The method of claim 18, wherein the adhesive is petroleum jelly.

20. The intrusion detection system of claim 1, further comprising buoyancy elements attached to the raw optical fiber such that the raw optical fiber is suspended in the underwater environment.

21. The intrusion detection system of claim 20, wherein the buoyance elements are micro particles, a micro particle defined as a particle having a maximum dimension of about 250 microns.

22. The intrusion detection system of claim 21, wherein the micro particles are microspheres.

23. The intrusion detection system of claim 21, wherein the micro particles are coated on an outer surface of the raw optical fiber by an adhesive, the micro particles being in direct contact with the adhesive.

24. The intrusion detection system of claim 21, wherein the adhesive is petroleum jelly.

* * * * *